United States Patent
Hinton

(10) Patent No.: US 11,028,939 B2
(45) Date of Patent: Jun. 8, 2021

(54) RISING STEM VALVE

(71) Applicant: Dixon Valve & Coupling Company, LLC, Chestertown, MD (US)

(72) Inventor: Austen Hinton, Mukwonago, WI (US)

(73) Assignee: Dixon Valve & Coupling Company, LLC, Chestertown, MD (US)

( * ) Notice: Subject to any disclaimer, the term of this patent is extended or adjusted under 35 U.S.C. 154(b) by 120 days.

(21) Appl. No.: 16/581,014

(22) Filed: Sep. 24, 2019

(65) Prior Publication Data

US 2020/0103048 A1  Apr. 2, 2020

Related U.S. Application Data

(60) Provisional application No. 62/737,237, filed on Sep. 27, 2018.

(51) Int. Cl.
| | |
|---|---|
| *F16K 35/00* | (2006.01) |
| *F16K 31/524* | (2006.01) |
| *F16K 31/60* | (2006.01) |
| *B60P 3/22* | (2006.01) |

(52) U.S. Cl.
CPC ...... *F16K 31/52441* (2013.01); *B60P 3/2245* (2013.01); *F16K 31/60* (2013.01); *F16K 35/00* (2013.01)

(58) Field of Classification Search
CPC ............... F16K 31/52441; F16K 31/60; F16K 35/00–16; B60P 3/2245
USPC .................................................. 251/89–116
See application file for complete search history.

(56) References Cited

U.S. PATENT DOCUMENTS

| | | | | |
|---|---|---|---|---|
| 1,998,914 A | * | 4/1935 | Wheaton | F16K 17/383 137/72 |
| 2,064,794 A | * | 12/1936 | Klauminzer | B05B 1/308 239/459 |
| 2,352,434 A | * | 6/1944 | Hoagland | F17C 13/04 251/89.5 |
| 2,364,909 A | * | 12/1944 | Murphy | F16K 35/06 70/179 |
| 2,441,094 A | * | 5/1948 | Alderfer | F16K 35/02 251/110 |
| 3,408,041 A | * | 10/1968 | Kraft | F16K 31/52 251/260 |
| 5,004,209 A | * | 4/1991 | Paquette | F16L 37/008 251/144 |

* cited by examiner

*Primary Examiner* — John Bastianelli
(74) *Attorney, Agent, or Firm* — Howson & Howson LLP

(57) ABSTRACT

A rising stem valve comprises a hollow valve body having a pair of ports defining a flow path through the valve body, a flange base through which one of the ports extends and a valve bonnet opposite the flange base. The valve includes a plunger/seal assembly able to be extended within the valve body to a first position for sealing the port in the flange base and to a second position for unsealing the port in the flange base. The valve also includes a locking mechanism for securing the plunger/seal assembly in the first position. The locking mechanism includes at least one cam lever attached to the valve body and a corresponding groove in a valve stem of the plunger/seal assembly.

9 Claims, 4 Drawing Sheets

RISING STEM VALVE

CROSS REFERENCE TO RELATED APPLICATIONS

This application claims the benefit under 35 USC § 119(e) of U.S. Provisional Patent Application No. 62/737,237, filed Sep. 27, 2018.

BACKGROUND

This disclosure relates to a valve for a tanker truck or like vessel used when loading or unloading fluent product from a tank or the like.

A manually operated valve is typically mounted to a rear of a tanker trailer and defines in and out flow of a fluent product to be stored, transported, or delivered. The truck may be a dairy truck for transporting milk or like dairy product. Alternatively, the fluent product may be a chemical or other fluent material. The valve requires a user to manually open or close the valve permitting or blocking flow therethrough.

SUMMARY

According to an embodiment, a rising stem valve is provided having a hollow valve body with a pair of ports defining a flow path through the valve body, a flange base through which one of the ports extends, and a valve bonnet opposite the flange base. The valve includes a plunger/seal assembly able to be extended within the valve body to a first position for sealing the port in the flange base and to a second position for unsealing the port in the flange base. The valve also includes a locking mechanism for securing the plunger/seal assembly in the first position. The locking mechanism includes at least one cam lever attached to the valve body and a corresponding groove in a valve stem of the plunger/seal assembly.

DETAILED DESCRIPTION

Figure 1:
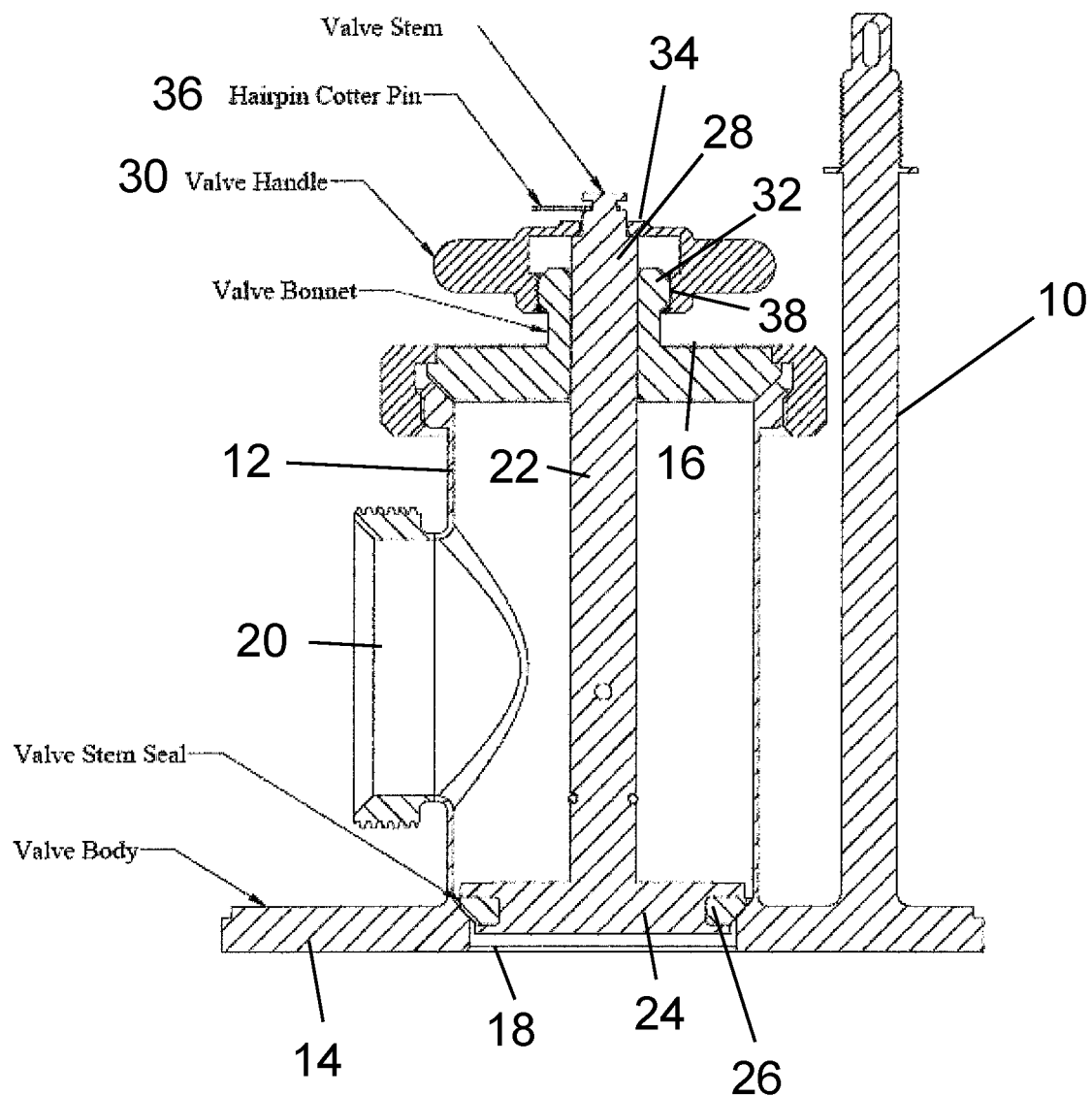
FIG. 1 is a cross-sectional view of a valve known in the art.

FIG. 1 provides an example of a prior art rising stem valve 10. The valve 10 includes a hollow valve body 12 having a mounting flange 14 at one end and a valve bonnet 16 at an opposite end. The flange 14 is configured for being mounted to a flange on a tanker truck or the like. The flange 14 defines a flange port 18 through which a material may flow into or out of the tanker truck. The valve body 12 also includes a side port 20 which also defines a path of flow of a material into or out of the valve body 12. Thus, in use, a material being loaded or unloaded from a tanker truck or the like will flow into the valve body 12 through one of the ports 18 or 20 and out of the valve body through the other of the ports, 18 or 20.

The valve 10 includes a valve stem 22 extending through the valve body 12. One end of the valve stem 22 includes a plunger 24 shaped to seal the flange port 18 and carrying a stem seal 26 for forming a fluid tight seal with the surrounding part of the valve body 12 to close the flange port 18 (i.e., block flow through the valve body 12). An opposite end 28 of the valve stem 22 extends through the bonnet 16 and interconnects to a valve handle 30. The valve handle 30 has a female threaded center hub 32 and a central opening 34 through which the valve stem 22 extends. A hairpin cotter pin 36 extends through the valve stem 22 to capture the handle 30 on a shoulder of the valve stem 22.

In use, the female threaded center hub 32 of the handle 30 may be manually threaded onto a mating male threaded hub 38 on the valve bonnet 16. Thus, as the handle 30 is threaded onto the hub 38 of the bonnet 16, the valve stem 22 and plunger 24 are driven downward or further into the valve body 12 to compress the stem seal 26 against the valve body 12 and seal the flange port 18. Alternatively, the handle 30 can be manually unscrewed from the bonnet 16 to permit the valve stem 22 to be manually slid through the bonnet 16 to move the plunger 24 away from the flange port 18 thereby permitting flow through the valve body 12. This type of valve may be referred to as a so-called rising stem valve as the stem is moved back and forth to seal or unseal the port in the flange.

A problem with the valve 10 is that the handle 30 and bonnet hub 38 of the bonnet 16 must physically meet to enable threaded engagement of these parts and to enable compression of the plunger 24 against the flange 14. In some instances, during unloading of a trailer or tanker, a vacuum is formed within the trailer tank which results in the valve plunger 24 and attached handle 30 being pulled to the closed position upon initial release of the handle 30 from the hub 38 of the bonnet 16. Because a pinch point may be created between the handle 30 and bonnet 16, an operator or user manually opening the valve 10 may be subject to injury as his/her fingers are pinched between the handle 30 and bonnet 16 as the vacuum pulls the plunger 24 and attached handle 30 to the closed position. Thus, a safety issue is presented.

Figure 2:
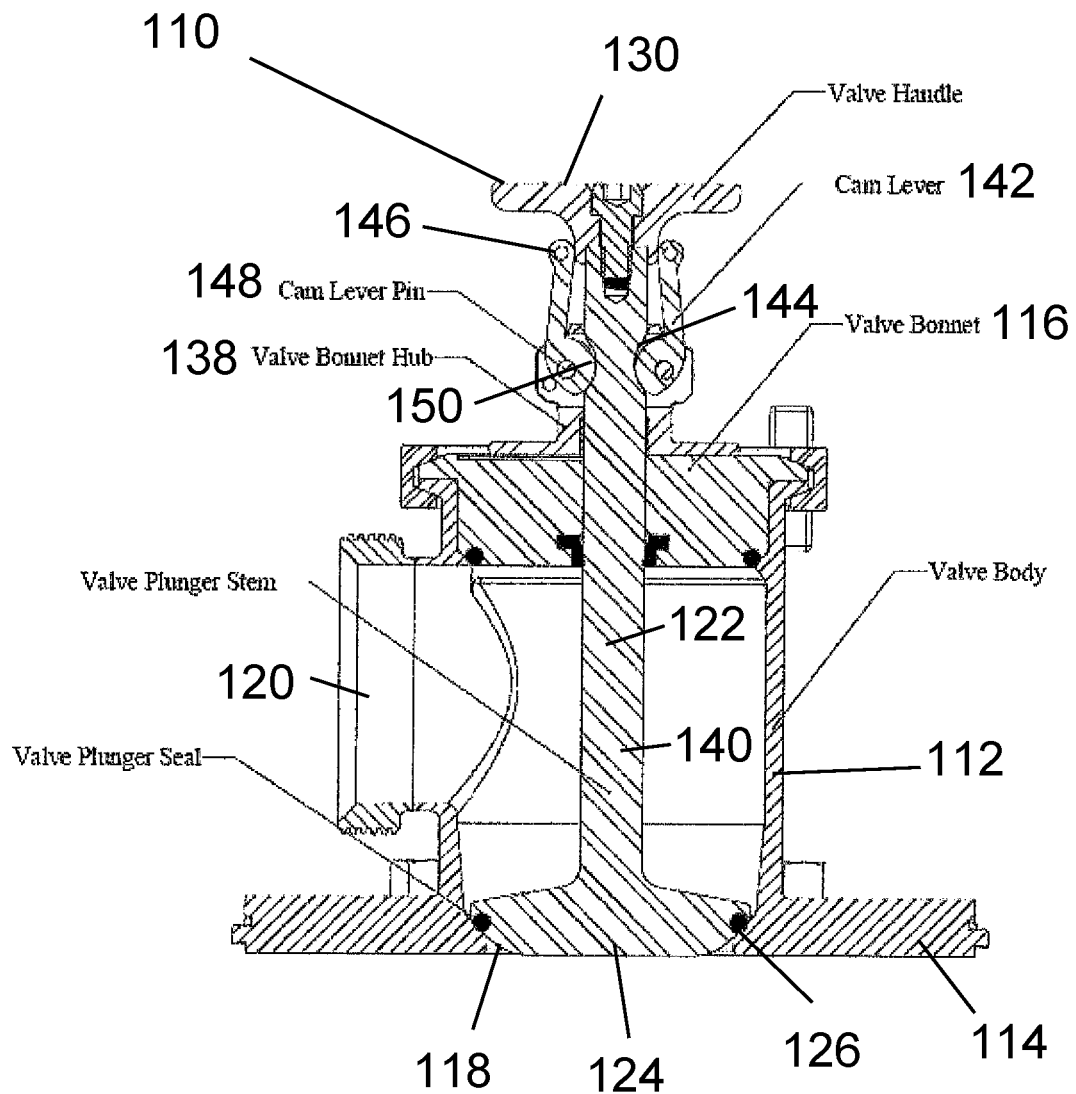
FIG. 2 is a cross-sectional view of a rising stem valve in accordance to an embodiment.

According to an embodiment, the above referenced problem is overcome. For example, see the rising stem valve 110 according to an embodiment in FIGS. 2-4.

The rising stem valve 110 includes a hollow valve body 112, which may be generally cylindrical, having a flange base 114 at one end and a valve bonnet 116 with a hub 138 at an opposite end. The flange base 114 may be configured for being mounted to a corresponding flange on a tanker truck or the like. By way of example, the flange 114 may be an ANSI class 150# flange.

The flange base 114 defines a flange port 118 through which a material may flow into or out of the tanker truck. The valve body 112 also includes a side port 120 which also defines a path of flow of a material into or out of the valve body 112. The direction of flow through the side port 120 may be oriented at about 90° relative to the direction of flow through the flange port 118. Thus, in use, a material being loaded or unloaded from a tanker truck or the like will flow into the valve body 112 through one of the ports 118 or 120 and out of the valve body through the other port, 118 or 120.

The valve 110 includes a plunger/seal assembly 140 that extends concentrically within the valve body 112 and may be moved back and forth within the valve body 112 in a longitudinal direction toward and away from the flange base 114. The plunger/seal assembly 140 enables the valve 110 to permit or prevent the flow of product through the valve body 112, in particular, through the port 118 in the flange base 114.

The plunger/seal assembly 140 may include a valve stem 122 with a plunger 124 located at one end thereof. The plunger 124 may have a seal 126 mounted thereon, such as an elastomeric O-ring or the like, for forming a fluid-tight seal with the flange base 114 surrounding the port 118. The valve stem 122 extends through the bonnet 116 and bonnet hub 138 of the valve body 112, and a valve handle 130 is mounted to an end of the valve stem 112 exterior of the valve body 112 at a spaced distance from the bonnet 116 and bonnet hub 138.

Figure 3:
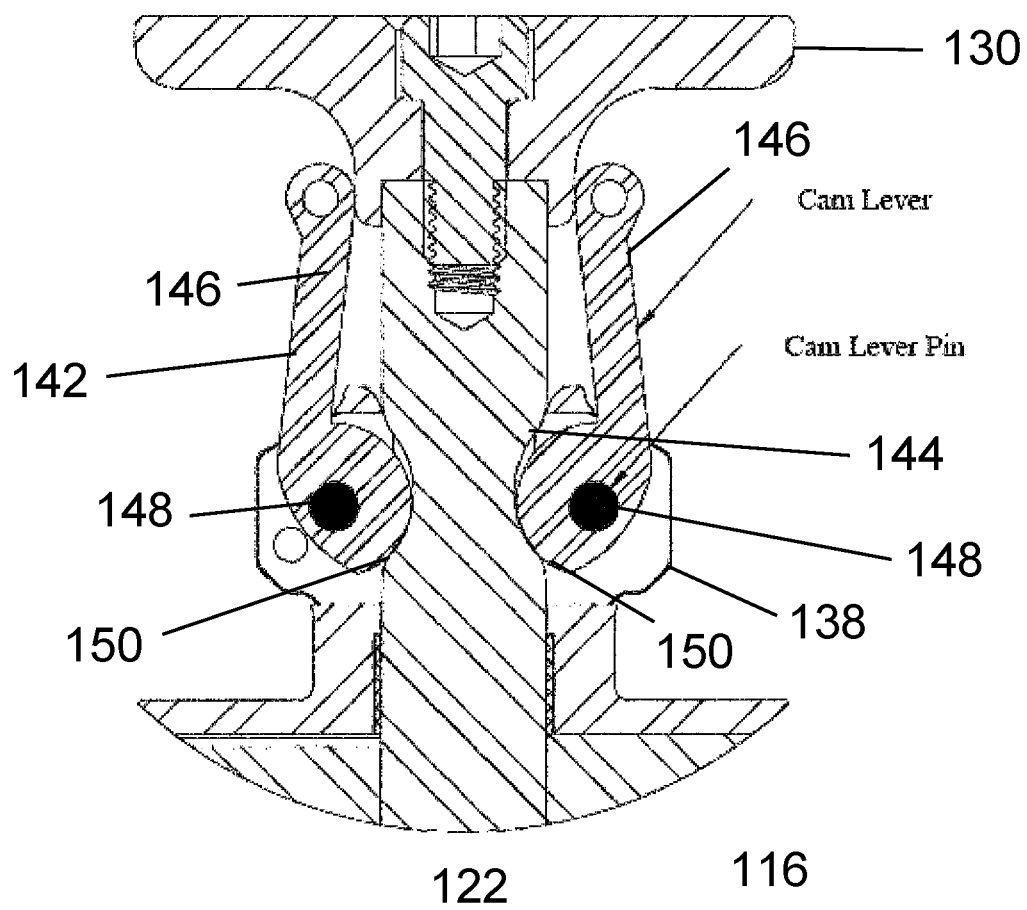
FIG. 3 is an enlarged cross-sectional view of one end of the valve of FIG. 2 in which cam levers are shown in a position to lock the valve in a closed (i.e., no flow) condition in accordance to an embodiment.
Figure 4:
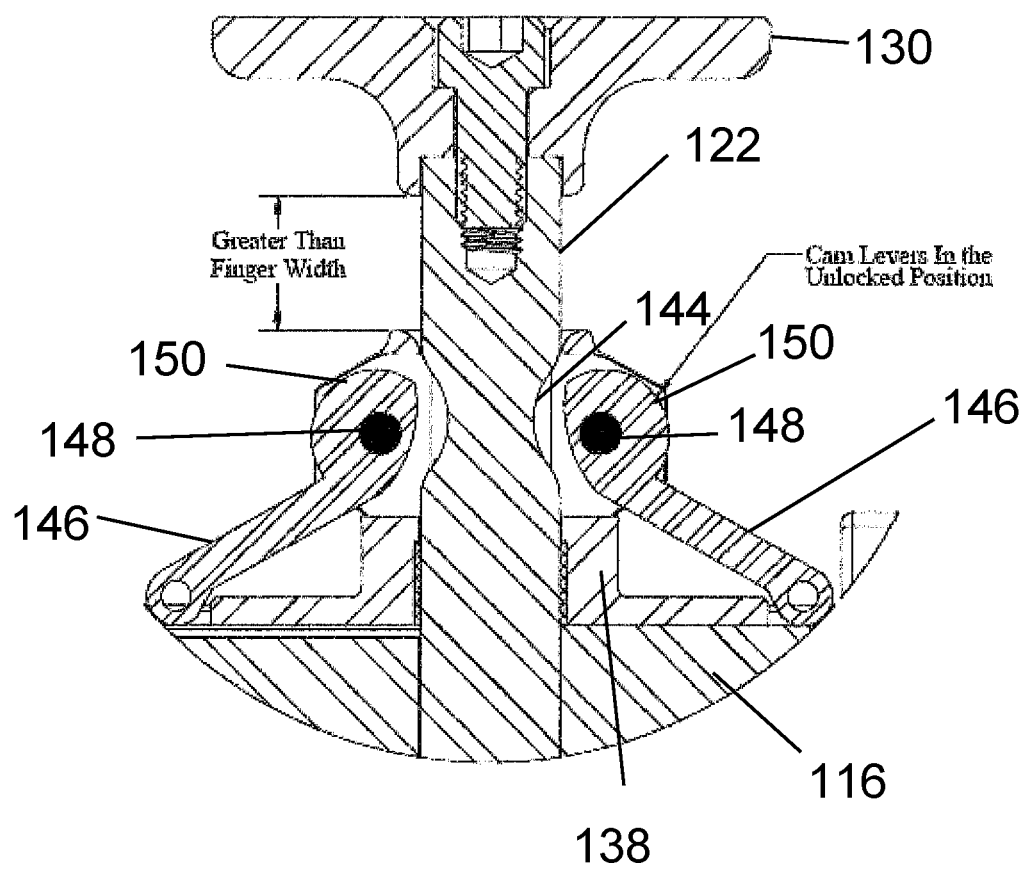
FIG. 4 is an enlarged cross-sectional view of one end of the valve of FIG. 2 in which cam levers are shown in a position permitting opening of the valve (i.e., permitting flow through the valve) in accordance to an embodiment.

The valve 110 is provided with a locking mechanism 142 which may be used to maintain the plunger/seal assembly 140 in a closed condition in which flow is prevented through the valve body 112. As best shown in FIGS. 3 and 4, the locking mechanism 142 includes a circumferential groove 144 formed in a part of the valve stem 122 extending exteriorly of the valve body 112 between the handle 130 and bonnet 116. In addition, the locking mechanism 142 includes one or more, preferable two, cam levers 146 that are each able to pivot about fixed cam lever pins 148 which secure the cam levers 146 to the hub 138 of the bonnet 116. The cam levers 146 are configured to engage the valve stem 142 within the groove 144 and generate sufficient axial force on the valve stem 122 to compress the seal 126 against the flange body to create a fluid-tight seal to close the valve 110.

As shown in FIG. 3, when the cam levers 146 are pivoted into a valve-closed position, locking portions 150 of the cam levers 146 are rotated to protrude within the groove 144, engage the valve stem 122, force the valve stem 122 in a direction toward the flange base 114, and lock the valve stem 122 in this condition. Thus, a seal is created by the plunger 124 and seal 126 and no flow is permitted through the port 118 in the flange base 114.

As shown in FIG. 4, when the cam levers 146 are manually pivoted relative to the pins 148, the locking portions 150 of the cam levers 146 are rotated out of the groove 144 and thereby no longer engage the valve stem 122 or prevent the valve stem 122 from sliding through the bonnet hub 138. Thus, the user may manually grip the handle 130, pull the handle 130 in a direction away from the valve body 112 to thereby release the seal between the flange base 114 and plunger 124 and open the port 118 in the flange base 114.

The spacing between the handle 130 and the bonnet 116 and bonnet hub 138 is a sufficiently large minimum set distance to accommodate the width of the fingers of a user/operator. Thus, the handle 130 and bonnet 116 never physically contact each other even when the valve 110 is in a closed condition. Thus, even in the event of pullback due to a vacuum within the tank, the user's fingers are protected against being pinched and are not subject to injury as all potential pinch points have been eliminated.

By way of example, and not be way of limitation, valve body 112 may be provided in 3-inch, 6-inch or other sizes and may be made of aluminum, brass, stainless steel, steel and steel alloys, iron, plastic or composite materials.

The foregoing description and specific embodiments are merely illustrative of the principles thereof, and various modifications and additions may be made to the apparatus by those skilled in the art, without departing from the spirit and scope of this invention.

I claim:

1. A rising stem valve, comprising:
    a hollow valve body having a pair of ports defining a flow path through the valve body, a flange base through which one of the ports extends, and a valve bonnet opposite the flange base;
    a plunger/seal assembly extendable within the valve body to a first position in which the port in the flange base is sealed and to a second position for unsealing the port in the flange base, the plunger/seal assembly including a valve stem;
    a locking mechanism for securing the plunger/seal assembly in the first position, the locking mechanism including at least one cam lever attached to the valve body and a corresponding groove in the valve stem
    the valve stem has a plunger at one end thereof for engaging the flange base to seal the port in the flange base when the plunger/seal assembly is extended to said first position;
    an opposite end of the valve stem extends through a hub in the valve bonnet and has a handle fixed thereto at a location spaced from the valve bonnet and exterior of the valve body;
    the groove is a circumferential groove on the valve stem at a location exterior of the valve body and between the handle and hub of the valve bonnet; and
    the at least one cam lever is secured to the hub of the valve bonnet with a cam lever pin about which the cam lever is able to be pivoted to lock the plunger/seal assembly in the first position and to unlock the plunger/seal assembly from the first position.

2. The rising stem valve according to claim 1, wherein the at least one cam lever includes a locking portion which protrudes into the groove when the valve stem is pivoted in a first direction to drive the plunger/seal assembly into sealing engagement with the flange base to seal the port in the flange base and to lock the plunger/seal assembly in the first position.

3. The rising stem valve according to claim 2, wherein, when the cam lever is pivoted in a reverse direction about the pin, the locking portion of the cam lever is positioned outside of the groove of the valve stem so that the sealing engagement of the plunger/seal assembly with the flange base is unlocked to unseal the port in the flange base.

4. The rising stem valve according to claim 3, wherein the at least one cam lever includes a pair of opposed cam levers connected to the hub of the valve bonnet with pins about which the cam levers are adapted to be pivoted.

5. The rising stem valve according to claim 4, wherein the plunger includes an elastomeric O-ring seal for being compressed against the flange base when the plunger/seal assembly is extended into the valve body to the first position.

6. The rising stem valve according to claim 5, wherein the other of the ports of the valve body is located in a sidewall of the valve body.

7. The rising stem valve according to claim 6, wherein the valve body is substantially cylindrical and the valve stem extends longitudinally and centrically within the valve body.

8. The rising stem valve according to claim 7, wherein the flange base is an ANSI class 150# flange.

9. The rising stem valve according to claim 7, wherein the minimum spacing between the handle and bonnet is sufficiently large to accommodate a width of a user's fingers.

* * * * *